United States Patent [19]

Kimura et al.

[11] Patent Number: 4,949,322

[45] Date of Patent: Aug. 14, 1990

[54] RANDOM-PLAY CONTROL SYSTEM IN DISK PLAYER

[75] Inventors: Toshiyuki Kimura; Yoshio Aoyagi; Fumio Endo, all of Kawagoe, Japan

[73] Assignee: Pioneer Electronic Corporation, Tokyo, Japan

[21] Appl. No.: 206,816

[22] Filed: Jun. 15, 1988

[30] Foreign Application Priority Data

Aug. 22, 1987 [JP] Japan .................................. 62-208773

[51] Int. Cl.⁵ ........................ G11B 17/22; G11B 27/30
[52] U.S. Cl. ........................................ 369/32; 369/30; 369/41; 360/69
[58] Field of Search ................................ 369/30–39, 369/41, 43, 44, 45, 47–50, 66, 98; 360/69, 72.1, 75, 78.04

[56] References Cited

U.S. PATENT DOCUMENTS

| | | | |
|---|---|---|---|
| 4,667,314 | 5/1987 | Iwashima | 369/32 |
| 4,779,252 | 10/1988 | Custers et al. | 369/32 |
| 4,787,073 | 11/1988 | Masaki | 369/32 |
| 4,792,934 | 12/1988 | Masaki | 369/34 |

FOREIGN PATENT DOCUMENTS

| | | | |
|---|---|---|---|
| 0210006 | 1/1987 | European Pat. Off. | 369/32 |
| 0265286 | 4/1988 | European Pat. Off. | 369/34 |
| 59-119579 | 7/1984 | Japan | 369/33 |

Primary Examiner—Alan Faber
Assistant Examiner—Steven R. Garland
Attorney, Agent, or Firm—Foley & Lardner, Schwartz, Jeffery, Schwaab, Mack, Blumenthal & Evans

[57] ABSTRACT

In a disk player, upon the lock-in of the focus servo at the turn-on of the main power source, the information recorded on an information recording disk is read and the sub-code information such as frame numbers, time code, or the like which are obtained from the read output are set to fundamental information for generation of random numbers in the random play mode, so that the initial value for the random numbers is set at random. The programs can be played in accordance with the different sequences even for the same disk. A preferable random-play control can be performed.

3 Claims, 2 Drawing Sheets

RANDOM-PLAY CONTROL SYSTEM IN DISK PLAYER

BACKGROUND OF THE INVENTION

1. Field of the Invention

The present invention relates to a random-play control system in a disk player.

2. Description of the Related Background Art

There is known a random-play control system in a disk player for playing at random a plurality of pieces of information such as music pieces recorded on an information recording disk (hereinafter, simply referred to as a disk) while setting a play sequence for those music pieces which are designated at random by using random numbers.

When a digital audio disk player is mounted on a motor vehicle and performs such a random-play control system, the control system is made operative by the main power source which is driven through the so-called accessory (hereinafter, abbreviated to ACC) switch of the motor vehicle. With this arrangement, a random number generator is initialized at every time when the ACC is turned on. On the other hand, the random number generator starts in response to a random play command. Therefore, the random number generator produces random numbers in the same sequence so that the music pieces are played in the same sequence for the same disk at the first random-play cycle upon the random-play command.

SUMMARY OF THE INVENTION

It is an object of the present invention to provide a random-play control system in a disk player in which the initial values of the random numbers are always set to different values, thereby avoiding such phenomenon that the programs on the same disk are always played in the same sequence at the initial step of the random-play.

The random-play control system in a disk player according to the present invention reads the information recorded on the information recording disk upon the lock-in of the focus servo and derives the so-called sub-code signal from the read signal so as to use it as the initial value for generation of the random numbers.

DETAILED DESCRIPTION OF A PREFERRED EMBODIMENT

Figure 1:
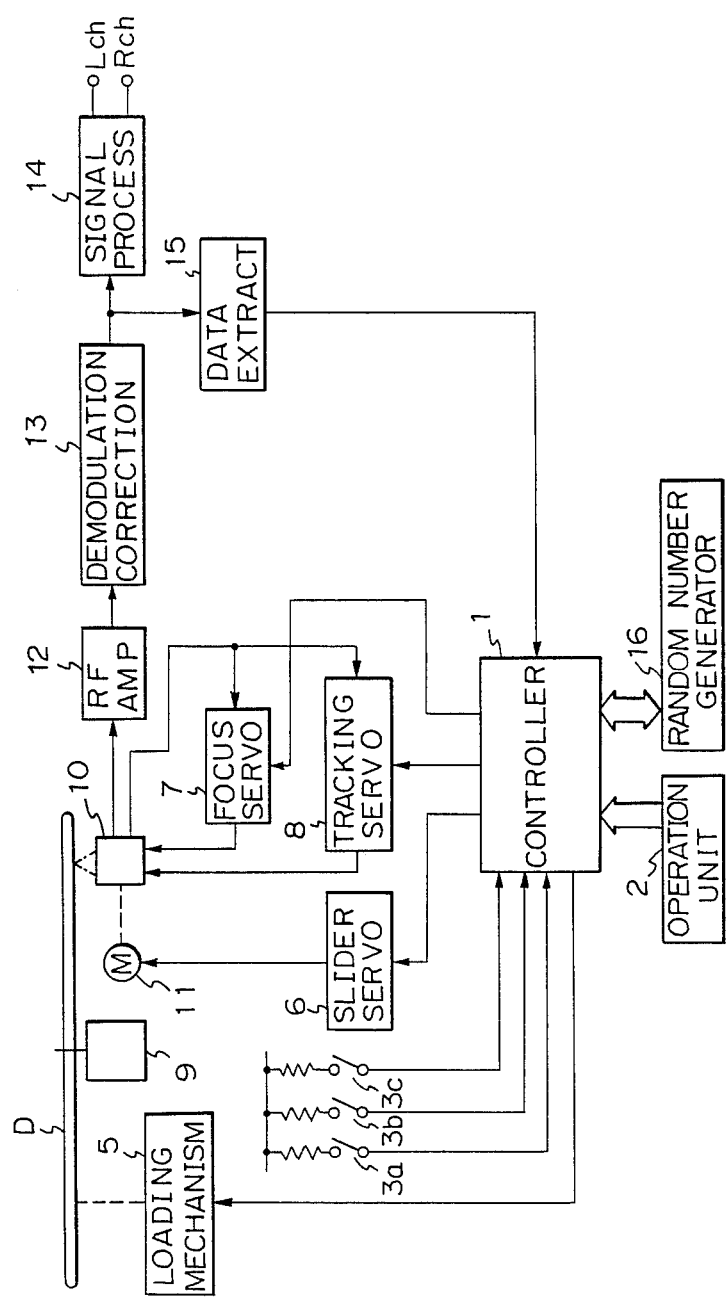
FIG. 1 is a block diagram showing an example of an arrangement of, for example, an auto-loading disk player which is provided with a random-play control system according to the present invention.

In FIG. 1, a controller 1 consists of a microcomputer including a memory (not shown) such as an RAM. On the basis of various kinds of command signals which are generated from a manual operation unit 2 and various kinds of detection signals which are produced from detecting switches 3a to 3c, the controller 1 controls a loading mechanism 5 a slider servo circuit 6, a focus servo circuit 7, a tracking servo circuit 8, and so on at predetermined timings. The switch 3a is a disk insertion detecting switch to detect that a disk D has been inserted from a slot (not shown) formed in the front panel of the player main body. The disk D carries thereon not only a plurality of information signals each representing an information piece such as a music piece but also the so-called sub-code signals. The disk D may be the so-called CD, CDV or LD which carries the information signals and the sub-code signals recorded under a predetermined format. In that case the sub-code signals are the so-called frame number signal, the so-called time code signal, etc. The switch 3b is a disk loading detecting switch to detect that the disk D has been conveyed to the play position by the loading mechanism 5. The switch 3c is a disk carry-out detecting switch to detect that the disk D has been carried out to the ejecting position by the loading mechanism. The controller 1 and other mechanisms are activated by the main power source which is activated by a voltage supplied through the accessory (ACC) switch of the motor vehicle.

The disk D is rotated by a spindle motor 9 and an information signal recorded on the disk D is read by an optical pickup 10. The pickup 10 includes: an optical system including a laser diode, an objective lens, a photodetector, and the like; a focus actuator to drive the objective lens in its optical axis direction with respect to the information recording surface of the disk D; and a tracking actuator to deviate a beam spot (information reading spot) which is generated from the pickup 10 in the radial direction of the disk for making the beam spot to trace the recording track. The focus actuator is controlled by the focus servo circuit 7. The tracking actuator is controlled by the tracking servo circuit 8. The pickup 10 is mounted on a slider (not shown) which is movable in the radial direction of the disk and is driven by a slider motor 11.

The read information signal which is produced from the pickup 10 in the form of an RF signal is supplied through an RF amplifier 12 to a demodulation and correction circuit 13 which demodulates the RF signal and performs the error correction operation. The output signal of the demodulation and correction circuit 13 is properly processed by a signal processor 14, so that audio output signals in the right and left channels are obtained. On the other hand, the output of the circuit 13 is directly supplied to a data extracting circuit 15 extracts the TOO (table of contents) data which is read out from the lead-in area before the start of the play operation and includes the sub-code signals which are also obtained from the read signal during the play operation. The extracted data are respectively supplied to the controller 1.

The controller 1 stores the TOC data supplied from the data extracting circuit 15, the data indicative of the play sequence designated through the manual operation unit 2, into the memory. Then, the controller 1 performs the control operation for loading ejecting the disk by means of the loading mechanism 5. The controller 1 operates to open or close the servo loops of the focus servo circuit 7 and tracking servo circuit 8. The controller 1 performs a normal play control for sequentially playing a plurality of music pieces recorded on the disk in accordance with the recorded order and a programmed play control for playing the music pieces in accordance with the sequence which has previously been stored in the memory. When the controller 1 receives a lock-in signal from the focus servo circuit 7 at an initial stage after the turn-on of the main power source, the controller 1 reads a sub-code signal derived from the read signal and supplies it to the random number generator 16 as an initial value for generation of the random numbers in the random number generator 16. When the controller 1 receives the random play mode command from the manual operation unit 2, the controller 1 controls the slider servo circuit 6 and the tracking servo circuit 8 so as to search some of the music pieces which are sequentially designated by the output data from the random number generator 16. The generator 16 may be so arranged as to latch a count value issued from n (n is a natural number) notation counter whose count value sequentially changes at a very short period in response to a random number issue command from the controller 1 and issues the latched count value ad its output random number until the next random number issue command.

Figure 2:
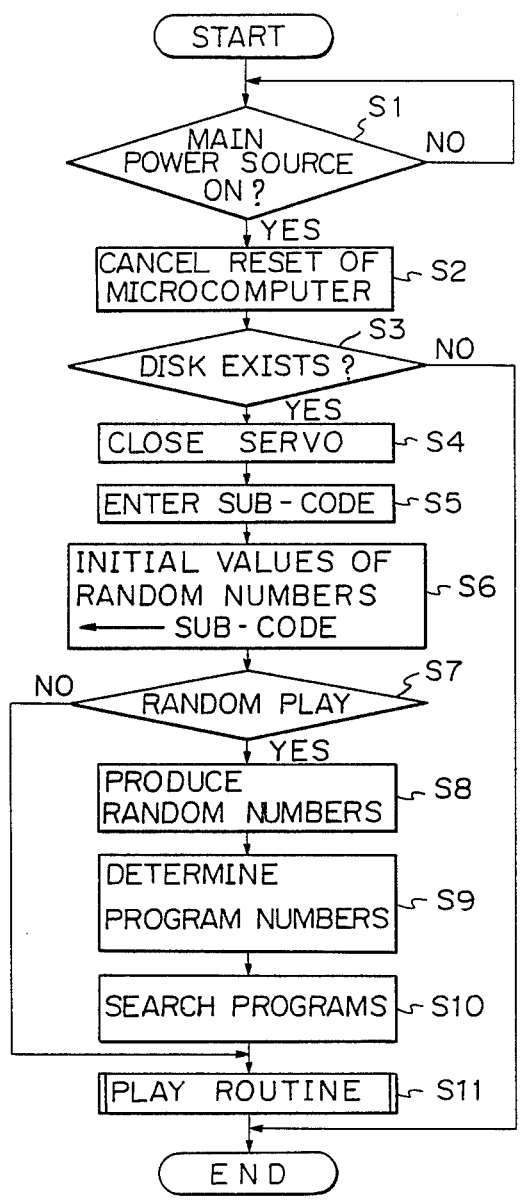
FIG. 2 is a flowchart showing a procedure of the random-play control system according to the present invention, which procedure is executed by a processor.

A routine for the random-play control system according to the present invention which is executed by a processor contained in the controller 1 will now be described with reference to a flowchart of FIG. 2. This routine is accessed when the main power source is turned on.

When it is detected that the power source is turned on (step S1), the processor first cancels the reset of the microcomputer (step S2). Then, the processor checks whether the disk has been still remained at the play position or not (step S3). If the presence of the disk has been detected, the servo loop is closed by the lock-in signal from the focus servo circuit 7 and makes the tracking servo loop to be subsequently closed (step S4). Thereafter, the sub-code signal is entered which is obtained from the data extract circuit 15 (step S5). For example, a frame number datum or a time code datum in the sub-code data is set as an initial value for generation of the random numbers in the random number generator 16 (step S6).

If, in the next step S7, it is determined that the random play mode has been instructed by the key operation in the manual operation unit 2, the random number issue command is sent to the random number generator 16 which then sequentially produces the random number data by using the frame number datum or the time code datum as the initial value (step S8). The order of the music pieces which are played at random is determined on the basis of the random number data (step S9). The leading position of the music pieces determined are searched (step S10). Thereafter, the sub-routine to control the play mode is accessed and the play mode routine is executed (step S11). After execution of the sub-routine, the processor restarts the execution of the main routine. If it is determined in step S7 that the random play mode is not designated, the normal play mode is executed in the step S11.

In this manner, after the focus servo has been locked in at the turn-on of the main power source, the information recorded on the disk is read and the sub-code data obtained from the read signal is set to the initial values of the random numbers, so that the initial values of the random numbers may be set to different values even for the same disk upon the repeated switchings of the accessory switch. That is, it is prevented that the music pieces or programs are performed in accordance with the same sequence each time when the main power source is turned on. The programs can be performed in accordance with the different sequences every time when the main power source is turned on. A desirable random play can be made.

As described above, according to the random play system according to the present invention, the information recorded on the disk is read and the sub-code information obtained from the read output is used as basic information for generation of random numbers, so that the initial values of the random numbers may be always set to the different values. Consequently, it is prevented that of the programs of the same disk, the programs are always played for the same disk in accordance with the same sequence. The programs can be played in accordance with the different sequences every turn-on of the main power source.

What is claimed is:

1. A random-play control system in a disk player for playing a disk containing sub-code signals which identify a plurality of programs, said random-play control system comprising:
   (a) a sub-code extractor for extracting said sub-code signals upon turn-on of a power source for the disk player;
   (b) a random number generator for generating random number data by starting from an initial number obtained from one of the extracted sub-code signals independently of said random number generator; and
   (c) determining means for determining one or more programs to be played in accordance with one or more random numbers of said random number data.

2. A system according to claim 1, wherein said number contained in the extracted sub-code signals is a frame number.

3. A system according to claim 1, wherein said number contained in the extracted sub-code signals is a time code.

* * * * *